United States Patent [19] — Hariu et al.

[11] Patent Number: 5,719,927
[45] Date of Patent: Feb. 17, 1998

[54] APPARATUS AND A METHOD FOR CONTROLLING A COLLECT CALL

[75] Inventors: Kiyotoshi Hariu; Yuichi Chiba, both of Sendai, Japan

[73] Assignee: Fujitsu Limited, Kanagawa, Japan

[21] Appl. No.: 554,233

[22] Filed: Nov. 8, 1995

[30] Foreign Application Priority Data

Nov. 17, 1994 [JP] Japan ................................. 6-283191

[51] Int. Cl.⁶ ........................................ H04M 15/00
[52] U.S. Cl. ........................ 379/114; 379/111; 379/229; 379/231; 379/121
[58] Field of Search ........................... 379/112, 113, 379/114, 115, 210, 212, 219, 220, 221, 229, 230, 67, 118, 120, 121, 127, 133, 134, 164, 165, 182, 183, 197–198, 201, 207, 226, 231

[56] References Cited

U.S. PATENT DOCUMENTS

| 5,303,298 | 4/1994 | Morganstein et al. | 379/67 |
| 5,339,356 | 8/1994 | Ishii | 379/231 |
| 5,347,574 | 9/1994 | Morganstein | 379/210 |
| 5,392,343 | 2/1995 | Davitt et al. | 379/212 |
| 5,422,943 | 6/1995 | Cooney et al. | 379/231 |
| 5,506,894 | 4/1996 | Billings et al. | 379/112 |
| 5,533,109 | 7/1996 | Baker | 379/231 |

*Primary Examiner*—Curtis Kuntz
*Assistant Examiner*—Binh K. Tieu
*Attorney, Agent, or Firm*—Helfgott & Karas, P.C.

[57] ABSTRACT

A collect call control device in a telephone exchange system in which a call signal for the collect call is sent from an international switching center through a central office exchange and a private branch exchange to a called subscriber, the private branch exchange has an attendant's switchboard connected and the attendant's switchboard has an attendant's telephone connected. The collect call control device detects whether the collect call request is indicated in a call signal which is input to the central office exchange from the international switching center and includes information on the collect call request and a called subscriber's telephone number; determines whether to control the collect call to the called subscriber based on the detection; generates an attendant's telephone number based on the determination; and connects the call signal to the attendant's telephone.

16 Claims, 6 Drawing Sheets

| ITGCLAH | F | / | ITG 0 | |
|---|---|---|---|---|
| (1) | | | | |

| | F | Next table exists | B'1 |
|---|---|---|---|
| | | Next table does not exist | B'0 |
| | ITG 0 | Next table address when F=1 | |

ITG 0
(2)   $(TG)_{10.3}$

```
  31        24                      0    0
 ┌──┬──────┬──────────────────────────┐
 │ F│  /   │         ITG 0 j          │
 └──┴──────┴──────────────────────────┘
                                        7
```

| | F | Next table exists | B'1 |
|---|---|---|---|
| | | Next table does not exist | B'0 |
| | ITG 0 j | Next table address when F=1 | |

ITG 0 j
(3)   $(TG)_{6.4}$

```
  31        24                      0    0
 ┌──┬──────┬──────────────────────────┐
 │ F│  /   │        ITG 0 j k         │
 └──┴──────┴──────────────────────────┘
                                        7
```

| | F | Next table exists | B'1 |
|---|---|---|---|
| | | Next table does not exist | B'0 |
| | ITG 0 j k | Next table address when F=1 | |

ITG 0 j k
(4)   $(TG)_{0.6}$ X6

```
  31                                    0
 ┌──────────────────────────────────────┐ n
 ├──────────────────────────────────────┤ n+1
 │              25      ⊠               │ n+2
 ├──────────────────────────────────────┤ n+3
 └──────────────────────────────────────┘
```

⊠ : CCC

*FIG. 4*

| CCSDDITH | | | |
|---|---|---|---|
| (1) | F | | CCS0 |

| F | Next table exists | B'1 |
|---|---|---|
| | Next table does not exist | B'0 |
| CCS0 | Next table address when F=1 | |

CCS0
(2) (STG)6.4

```
 31      24                              0    0
┌───┬────┬──────────────────────────────┐
│ F │    │          CCS0j               │
├───┴────┴──────────────────────────────┤
│                                       │
└───────────────────────────────────────┘ 7
```

| F | Next table exists | B'1 |
|---|---|---|
| | Next table does not exist | B'0 |
| CCS0j | Next table address when F=1 | |

CCS0j
(3) (STG)0.8

```
 31  28  24  20  12  12  8   4   0   0
┌──┬────┬───┬───┬───┬───┬───┬───┬───┐
│I │EXTL│EC6│EC5│EC4│EC3│EC2│EC1│EC0│
├──┴────┴───┴───┴───┴───┴───┴───┴───┤
│                                    │
│                                    │ 63
└────────────────────────────────────┘
```

| I | Defined | B'1 |
|---|---|---|
| | Undefined | B'0 |
| EXTL | Extension code length | D'1 ~ D'7 |
| ECx | Extension code | B'0001 ~ 1010 |
| | Empty extension code | B'0000 |

*FIG. 5*

APPARATUS AND A METHOD FOR CONTROLLING A COLLECT CALL

BACKGROUND OF THE INVENTION

1. Field of the Invention

The present invention relates to an apparatus and a method for controlling a collect call in a telephone exchange system, particularly to an apparatus and a method for controlling a collect call which is connected via a private branch exchange to a subscriber within an enterprise.

The collect call is a call for which a called subscriber agrees to pay instead of a calling subscriber. It can also be used in an international call between different countries, if a called subscriber of a country accepts the request for a collect call from a calling subscriber of other country.

The international collect call, for example, is conducted as follows: First, a calling subscriber of a country telephones an operator of an international switching center of a calling-party country, requesting a collect call to a called subscriber of other country. The operator notifies the called subscriber of an international call for collect call. If the called subscriber accepts the request by confirming the name or the telephone number of the calling subscriber, a collect call is established between the calling and called subscribers of different countries.

Recently, as the collect call to a subscriber within an enterprise is becoming increasingly popular, the case is ever increasing where an enterprise is charged for collect calls, causing a large amount of expenses to the enterprise. However, it was very difficult to control the collect call, because there was no way conventionally to determine whether the call is associated with the enterprise or whether the call is for private use.

2. Description of the Related Art

FIG. 1 is a block diagram illustrating the background in which a conventional collect call was practiced.

An international switching center is located in a calling-party country. A central office exchange and a private branch exchange (abbreviated to PBX) are located in the called-party country. A calling subscriber T1 telephones a calling-party operator O1 at an attendant's switchboard in the international switching center, requesting a call for collect call. The call is transmitted from the international switching center through the central office exchange and the private branch exchange and connected to the called subscriber T2.

When the called subscriber responds to the call, the operator O1 notifies the called subscriber T2 that there is a call requesting a collect call from the calling subscriber T1. If the called subscriber T2 accepts the request, the operator O1 connects the calling subscriber to the called subscriber, thus establishing a collect call. To be more specific, the calling subscriber T1 telephones the calling-party operator O1, requesting a collect call to the called subscriber T2 having telephone number 123-AAA, the operator O1 originates a call so as to transmit an interoffice signal including information requesting a collect call (hereinafter called a collect call identification flag or CCI flag) and the called subscriber's telephone number via a direct dialing in-group trunk (abbreviated to DDIT) to the central office exchange of the called-party country.

Upon recognizing that the telephone number 123-AAA is registered as a subscriber and detecting the collect call request signal in the interoffice signal, the central office exchange determines the call to be a collect call. Then, the central office exchange sends a dial signal AAA to the private branch exchange accommodating the telephone number 123-AAA to connect the calling-party operator O1 to the called subscriber T2. When responded to by the called subscriber T2, the calling-party operator O1 notifies the called subscriber T2 of the call requesting a collect call from the calling subscriber T1. If the called subscriber T2 accepts the request, the calling-party operator O1 connects the calling subscriber T1 to the called subscriber T2, thus establishing a collect call.

It is a problem that a collect call can connect with a called subscriber within an enterprise or a company only at a judgment of the called subscriber's own, regardless of the business relationships between the calling subscriber T1 and called subscriber T2.

It is therefore, another problem that the collect call, if used privately, imposes a large amount of undue telephone charges on the enterprise or company.

SUMMARY OF THE INVENTION

It is an object of the present invention to control a collect call terminated to a subscriber within an enterprise or company.

It is another object of the present invention to prevent a collect call from being used privately and thereby to decrease undue telephone charges charged on the enterprise or company.

To achieve the above and other objects, the present invention provides request detection means, number generation means and connection means. In an apparatus for controlling a collect call in a telephone exchange system in which a call for a collect call is sent from a first central-office exchange through a second central-office exchange and a private branch exchange to a called subscriber, the private branch exchange has an attendant's switchboard connected thereto and the attendant's switchboard has an attendant's telephone connected thereto, the request detection means detects that the collect call request is indicated in an inter-office signal which is input to the second central-office exchange from the first central-office exchange and includes information on the collect call request and a called subscriber's telephone number. The number generation means generates an attendant's telephone number. The connection means connects the call for a collect call to the attendant's telephone.

BRIEF DESCRIPTION OF THE DRAWINGS

FIG. 4 is a detailed example of the collect call control table t1 shown i FIG. 2; and FIG. 5 is a detailed example of the operator number table t2 shown i FIG. 2.

Throughout the above-mentioned drawings, identical reference numerals are used to designate the same or similar component parts.

DESCRIPTION OF THE PREFERRED EMBODIMENTS

Figure 1:
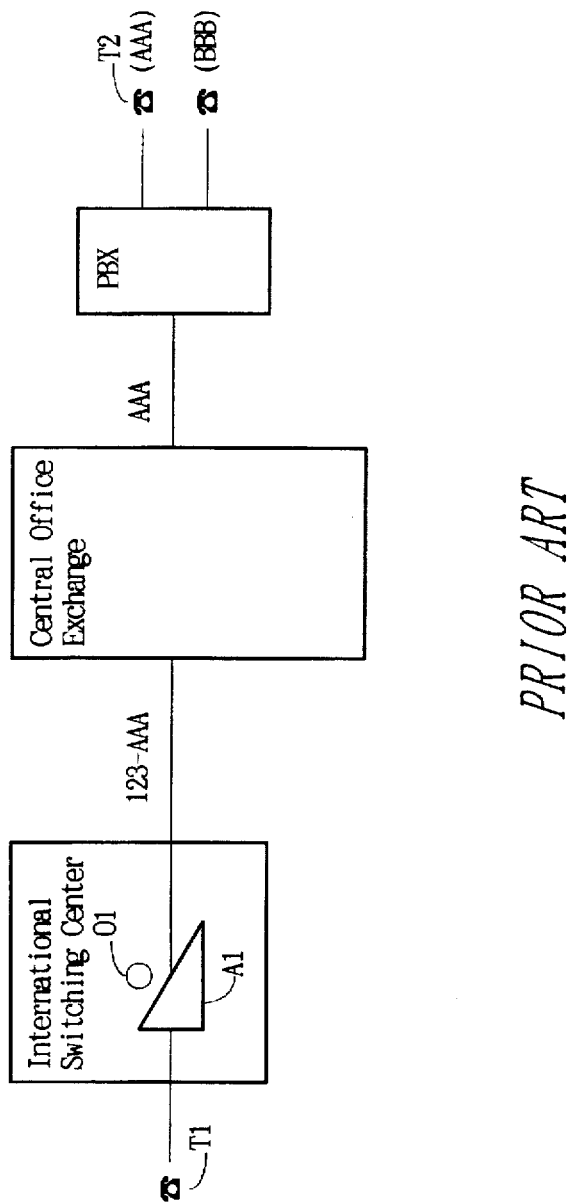
FIG. 1 is a block diagram illustrating the background in which a conventional collect call was practiced.
Figure 2:
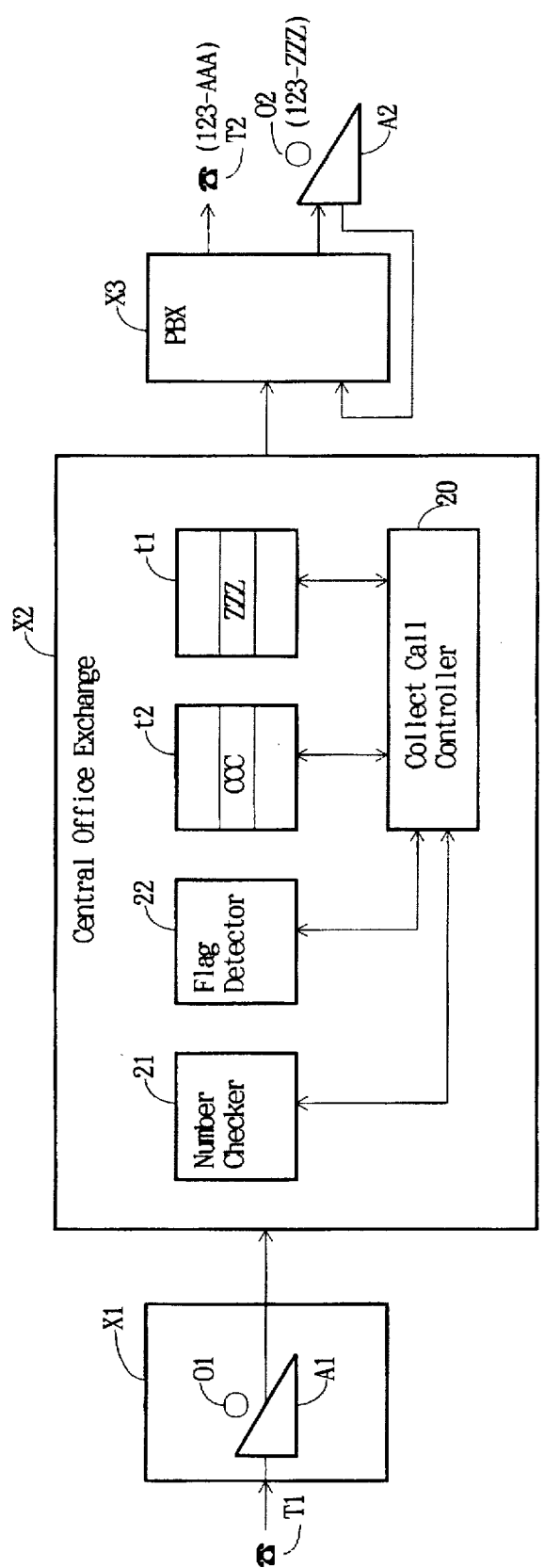
FIG. 2 is a block diagram illustrating a collect call control device of the present invention.

FIG. 2 is a block diagram illustrating a collect call control device of the present invention.

The collect call control device of the present invention, which is provided in the central office exchange X2, consists of a number checker 21, a flag detector 22, a collect call control table t1, an operator number table t2 and a collect call controller 20.

The number checker 21 checks whether a called telephone number is registered for a subscriber accommodated in the central office exchange X2 and obtains information specifying a telephone line connecting the central office exchange X2 and the private branch exchange X3 (hereinafter the information is called a trunk group number). The trunk group number may be looked up in a table storing a trunk group number corresponding to a subscriber's telephone number or may be a number extracted from the called subscriber's telephone number (e.g., 123-AAA).

The flag detector 22 detects that the collect call identification (abbreviated to CCI) flag is set in the IAI message of the interoffice signal C7 TUP (No. 7 signal) transmitted from the international switching center X1.

The collect call control table t1 stores, corresponding to the subscriber's telephone number or the trunk group number, information on whether to control a collect call (hereinafter the information is called a collect call control flag or CCC flag) to a called subscriber or private branch exchange, respectively. The collect call control table t1 may be a table storing the CCC flag corresponding to the trunk group number as shown in FIG. 4.

The operator number table t2 stores, corresponding to the trunk group number, a telephone number of an operator at the attendant's switchboard connected to the private branch exchange (PBX) X3 which accommodates subscriber's telephone numbers. The operator number table t2 may be a table storing the operator's telephone numbers corresponding to the trunk group number as shown in FIG. 5.

The collect call controller 20 controls a collect call in cooperation with the number checker 21 and flag detector 22, and referring to the collect call control table t1 and operator number table t2 as follows:

If the number checker 21 recognizes that the called telephone number is registered as a subscriber and if the flag detector 22 detects the CCI flag in the above-mentioned interoffice signal, the collect call controller 20 reads the collect call control table t1 based on the trunk group number obtained by the number checker 21 and checks whether the CCC flag is set. When the CCC flag is set, the collect call controller 20 reads the operator number table t2 based on the trunk group number to retrieve an operator's telephone number (e.g., 123-ZZZ). The telephone number retrieved is for an operator at the attendant's switchboard A2 connected to the private branch exchange X3 which accommodates the called subscriber (e.g., telephone number 123-AAA).

Then, the collect call controller 20 transfers a the call to the private branch exchange X3 with the called subscriber's telephone number (123-AAA) replaced by the operator's telephone number (123-ZZZ), thus connecting the call to the operator O2 in order to enable the operator O2 to judge whether to permit the collect call request. If the operator is busy, the collect call controller 20 looks up another operator's telephone number in the operator number table t2 and retries the above-mentioned operation. When operators are busy for all the operator's telephone numbers registered, the collect call controller 20 controls the central office exchange X2 so as to send a busy tone to the calling attendant's switchboard A1.

Figure 3A:
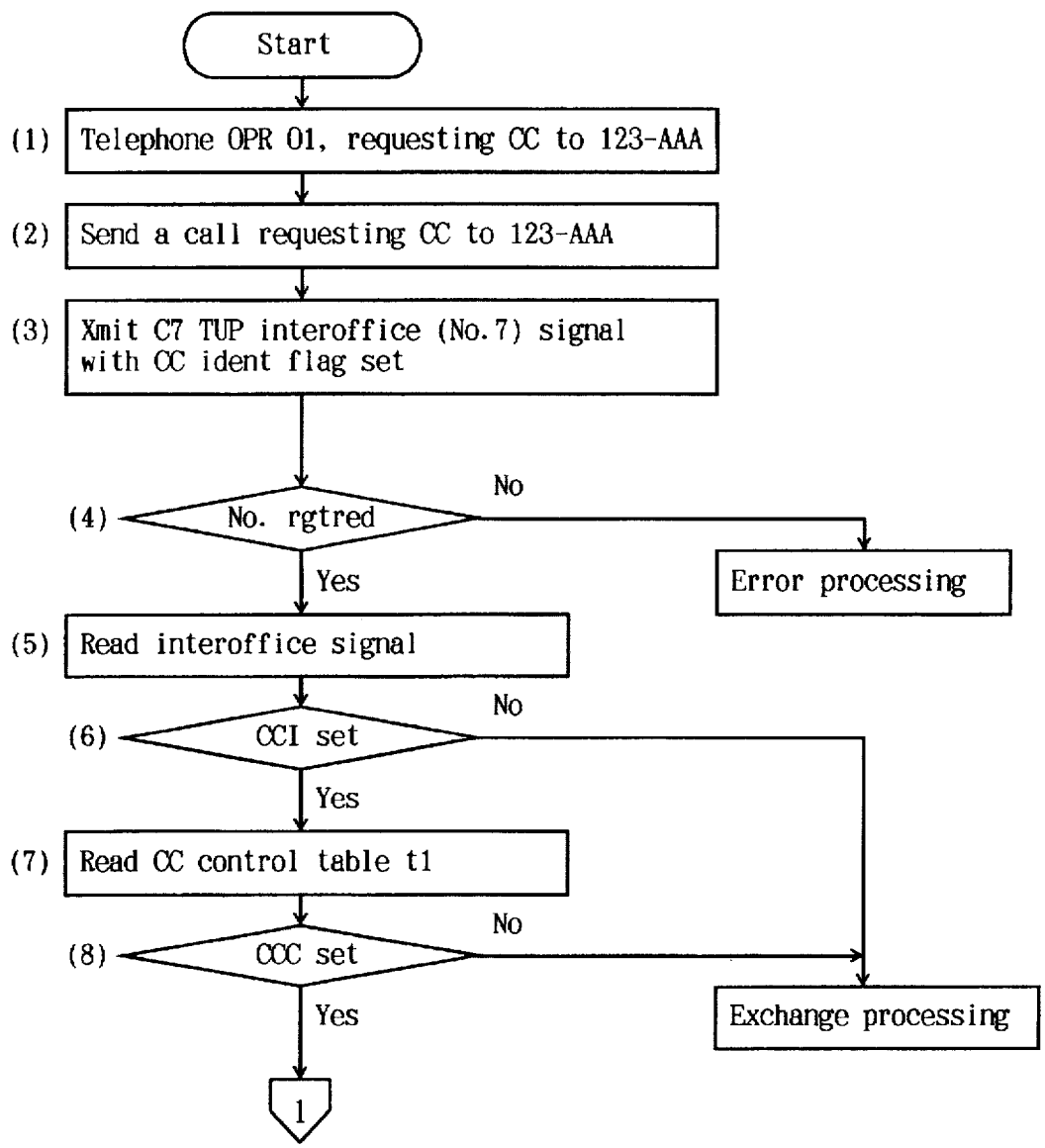
FIGS. 3A and 3b are flowcharts illustrating the operation of the collect call control device of the present invention.
Figure 3B:
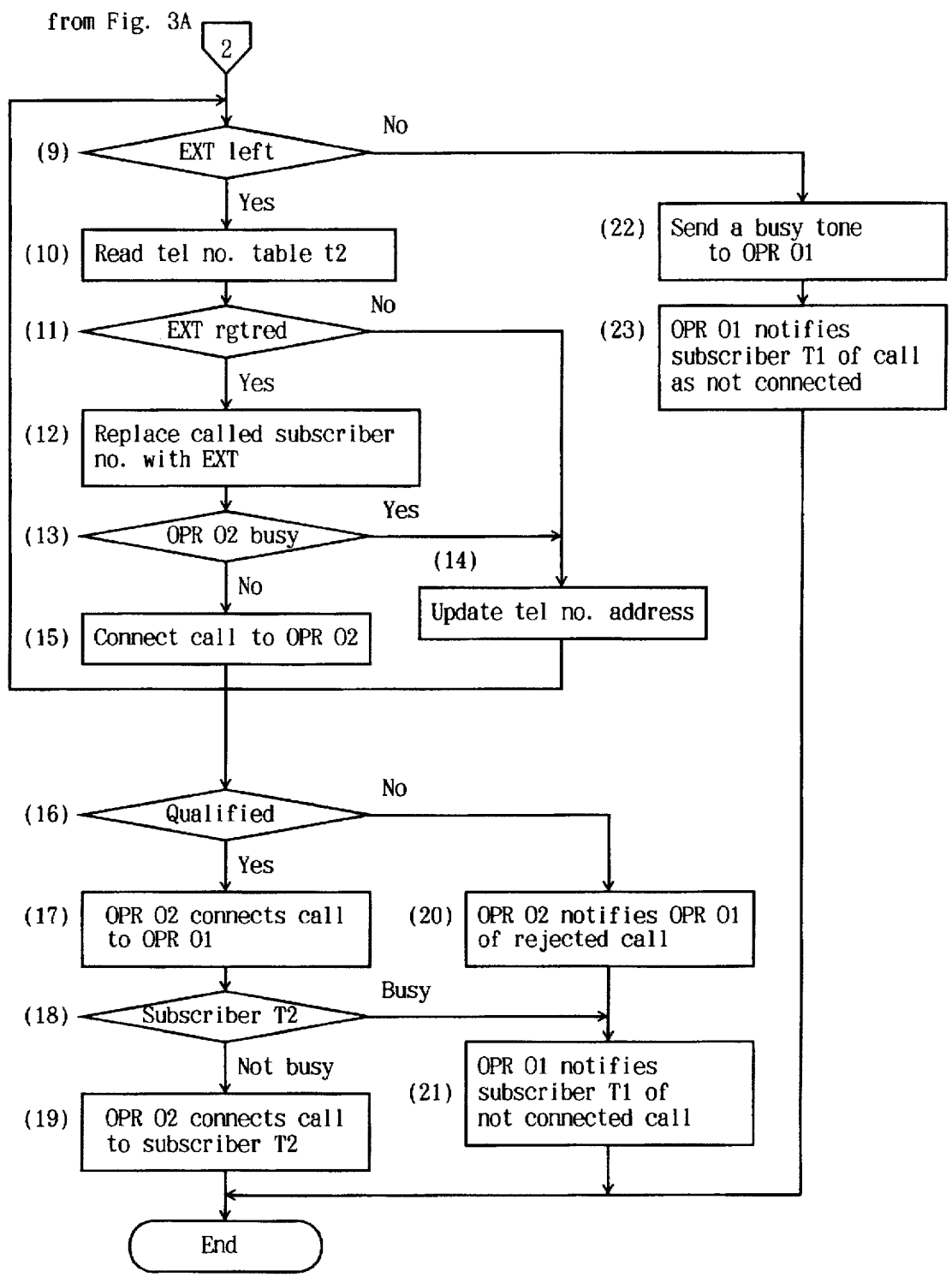

FIGS. 3A and 3B are flowcharts illustrating the operation of the collect call control device of the present invention.

(1) The calling subscriber T1 telephones the operator (OPR) O1 of the international switching center X1 located in the calling-party country, requesting a collect call (abbreviated to CC) to the called subscriber T2 having the telephone number 123-AAA.

(2) The operator O1 originates a call requesting a collect call to a subscriber having the telephone number 123-AAA.

(3) The international switching center X1 transmits onto the trunk group of the called-party central office exchange, a C7 TUP interoffice signal (No. 7 signal) message including the telephone number 123-AAA and having the collect call identification (abbreviated to CCI) flag set.

(4) In the central office exchange 2X, the number checker 21 checks whether the called telephone number is registered as a subscriber number accommodated in the central office exchange 2A. Unless registered, the processing goes to the usual error processing.

(5) If the telephone number is registered, the flag detector 22 checks whether the CCI flag is set in the C7 TUP interoffice signal.

(6) Unless the CCI flag is set, the normal telephone exchange processing is performed.

(7) If the CCI flag is set, the collect call controller 20 reads the collect call control table t1 to check whether the CCC flag is registered therein, which flag indicates a collect call be controlled.

(8) Unless the CCC flag is registered, the telephone exchange processing is performed. If the CCC flag is registered, the processing goes to step (9).

(9) It is determined whether there is any operator's telephone number (abbreviated to EXT) available left in the operator number table t2. If the determination is negative, the processing goes to the error processing in step (22).

(10) If the determination in step (9) is positive, an area of the operator number table t2 is read.

(11) It is determined whether there is registered an operator's telephone number (EXT). If there is no EXT registered, the processing goes to step (14).

(12) If an EXT is registered, the call is transferred to the private branch exchange X3 with the called subscriber's telephone number 123-AAA replaced by the operator's telephone number EXT read in step (10), in order to call an operator at that number EXT.

(13) It is checked whether the operator O2 called in step (12) is busy.

(14) The area address specifying the EXT item in the operator number table t2 is updated so as to read a next-registered EXT in the table t2 and the processing returns to step (9).

(15) If the called-party operator O2 is not busy, the private branch exchange X3 connects the call to the operator O2 at the attendant's switchboard A2.

(16) The called-party operator O2 judges whether the calling subscriber is qualified for collect call based on the calling subscriber's telephone number and/or the name of the calling party.

(17) When the judgement is positive, the called-party operator O2 connects the call to the calling-party operator O1.

(18) The called-party operator O2 checks whether the called subscriber T2 is busy. If busy, the processing goes to step (21).

(19) If not busy, the called-party operator O2 connects the call to the called subscriber T2.

(20) The judgment in step (17) is negative, the called-party operator O2 notifies the calling-party operator O1 that the collect call request has been rejected.

(21) The calling-party operator O1 notifies the calling subscriber T1 that the call was not connected.
(22) When the determination in step (9) is negative, a busy tone is sent to the calling-party operator O1.
(23) The calling-party operator O1 notifies the calling subscriber T1 that the called subscriber is busy.

FIG. 4 is a detailed example of the collect call control table t1 shown i FIG. 2.

The trunk group number of the trunk which connects the central office exchange X2 to the private branch exchange X3, is derived from the input trunk group (ITG). Then, tables (ITGCLAH, ITGO, ITGOj and ITGOjk) related to the the private branch exchange (PBX) X3 are looked up sequentially based on the trunk group number, finally to read the collect call control (CCC) flag corresponding to the private branch exchange X3 concerned. The CCC flag indicates that collect call to subscribers accommodated in the private branch exchange X3 be controlled.

The trunk group number is assumed here to re represented by 13 bits numbered consecutively bit 0 through 12. The notation $(TG)_{x,y}$ represents a number expressed by the consecutive y bits starting with bit x of the trunk group number, i.e., bit x to bit (y−1) of the trunk group number. The number $(TG)_{x,y}$ is used as a displacement in calculating a relative address. Each one word constituting the tables ITGCLAH, ITGO and ITGOj includes an F bit and an address field. The F bit being binary 1 (represented by B'1) indicates that a next table exists to be referred to. The address field (e.g., ITGO address) indicates a starting address where the next table is stored. The tables are looked up as follows:

(1) The first-level table ITGCLAH is stored in a predetermined address. When the F bit is 1, it indicates that the next table ITGO exists and is stored in the memory locations starting with the ITGO address.
(2) A word (e.g., 32 bits) is looked up by relative-addressing (i.e., addressing the memory location $(TG)_{10,3}$ added to the ITGO address) the second-level table ITGO. When the word has the F bit being 1, it indicates that the next table ITGOj exists and is stored in the memory locations starting with the ITGOj address.
(3) A word is looked up by relative-addressing (i.e., addressing the memory location $(TG)_{6,4}$ added to the ITGj address) the third-level table ITGOj. When the word has the F bit being 1, it indicates that the next table ITGOjk exists and is stored in the memory locations starting with the ITGOjk address.
(4) An area of 6 words are looked up by relative-addressing (addressing i.e., addressing the memory location $(TG)_{0,\neq}$ added to the ITGjk address) the third-level table ITGOjk in 6-word units (represented by X6). The collect call control (CCC) flag, which indicates that collect call to a subscriber accommodated in the private branch exchange X3 be controlled, is stored in a predetermined location within the area.

FIG. 5 is a detailed example of the operator number table t2 shown i FIG. 2.

In the same way as in the description of FIG. 4, tables (CCSDDITH, CCSO and CCSOj ITGOjk) related to the private branch exchange X3 are looked up sequentially based on the trunk group number, finally to read the operator's telephone number (abbreviated to EXT) accommodated in the private branch exchange X3.

(1) The first-level table CCSDDITH is stored in a predetermined address. When the F bit is 1, it indicates that the next table CCSO exists and is stored in the memory locations starting with the CCSO address.
(2) A word is looked up by relative-addressing the second-level table CCSO using a portion of the trunk group number as a displacement. When the word has the F bit being 1, it indicates that the next table ccsOj exists and is stored in the memory locations starting with the CCSOj address.
(3) A word is looked up by relative-addressing the third-level table CCSOj using a portion of the trunk number as a displacement. The 3-bit EXTL field of the word indicates the number of digits 0–7 of the operator's telephone number. Each of 4-bit ECx (x=0–6) fields indicates the number 0–9 of each digit of the operator's telephone number (binary 0001–1001 and 1010 represent decimal 1–9 and 0 in the order and binary 0000 indicates none in the digit).

As is apparent from the above description, since a call for collect call to an enterprise is connected once to an operator and left to the operator's judgement whether to permit the collect call, the present invention can prevent a collect call from being misused privately and can spare telephone charges imposed unduly on an enterprise or a company. Also, since a plurality of operator's telephone numbers can be registered in the operator number table t2, the present invention can respond promptly to a plurality of calls for a collect call occurring simultaneously and therefore, can leave the judgement alternately to unengaged operators.

What is claimed is:

1. An apparatus for controlling a collect call in a telephone exchange system, a request for the collect call being sent from a first central-office exchange through a second central-office exchange and a private branch exchange to a called subscriber, the private branch exchange being connected to an attendant's telephone, said apparatus in the second central-office exchange comprising:

request detection means for detecting that a collect call request is indicated in an interoffice signal, which is input to the second central-office exchange from the first central-office exchange and includes information on the collect call request and a called subscriber's telephone number;

number generation means responsive to the detection by said request detection means for generating an attendant's telephone number; and connection means for connecting the request for the collect call to the attendant's telephone by sending to the private branch exchange the attendant's telephone number generated by said number generation means.

2. An apparatus according to claim 1, wherein said apparatus further comprises control determination means for determining whether to control the collect call to the called subscriber based on the detection by said request detection means, and wherein said number generation means generates the attendant's telephone number based on the determination by said control determination means.

3. An apparatus according to claim 1, wherein said number generation means comprises first storage means for storing the attendant's telephone number corresponding to a subscriber's telephone number accommodated in the second central-office exchange and makes the generation by referring to said first storage means.

4. An apparatus according to claim 3, wherein said first storage means stores the attendant's telephone number corresponding to a trunk information specifying a telephone line connecting the second central-office exchange and the private branch exchange.

5. An apparatus according to claim 2, wherein said control determination means comprises second storage means for storing information whether to control a collect call corresponding to a subscriber's telephone number accommodated in the second central-office exchange and makes the determination by referring to said second storage means.

6. An apparatus according to claim 5, wherein said second storage means stores information whether to control a collect call corresponding to trunk information specifying a telephone line connecting the second central-office exchange and the private branch exchange.

7. An apparatus according to claim 3, wherein said first storage means stores a plurality of operator's telephone numbers, and wherein, when an attendant's telephone is busy, said call connection means connects the call signal to another attendant's telephone.

8. An apparatus according to claim 7, wherein said apparatus further comprises rejection means for sending a busy signal to the first central-office exchange when all the attendant's telephones are busy.

9. A method for controlling a collect call in a telephone exchange system, a request for a collect call being sent from a first central-office exchange through a second central-office exchange and a private branch exchange to a called subscriber, the private branch exchange being connected to an attendant's telephone said method comprising the steps of:

(a) detecting that a collect call request is indicated in an interoffice signal, which is input to the second central-office exchange from the first central-office exchange and includes information on the collect call request and a called subscriber's telephone number;

(b) generating an attendant's telephone number in response to the detection by said request detection means; and (c) connecting the request for a collect call to the attendant's telephone by sending to the private branch exchange the attendants telephone number generated by said number generation means.

10. A method according to claim 9, wherein said method further comprises the step of (d) determining whether to control the collect call to the called subscriber based on said detecting in step (a), and wherein said generating in step (b) generates the attendant's telephone number based on said determining in step (d).

11. A method according to claim 9, wherein said generating in step (b) comprises the step of (e) storing the attendant's telephone number corresponding to a subscriber's telephone number accommodated in the second central-office exchange and makes said generating in step (b) by referring to said storing in step (e).

12. A method according to claim 11, wherein said storing in step (e) stores the attendant's telephone number corresponding to a trunk information specifying a telephone line connecting the second central-office exchange and the private branch exchange.

13. A method according to claim 10, wherein said determining in step in (d) comprises the step of (f) storing information whether to control a collect call corresponding to a subscriber's telephone number accommodated in the second central-office exchange and makes said determining by referring to said storing in step (f).

14. A method according to claim 13, wherein said storing in step (g) information whether to control a collect call corresponding to trunk information specifying a telephone line connecting the second central-office exchange and the private branch exchange.

15. A method according to claim 11, wherein said storing in step (e) stores a plurality of operator's telephone numbers, and wherein said connecting in step (c) connects the call signal to another attendant's telephone when an attendant's telephone is busy.

16. A method according to claim 15, wherein said method further comprises the step of (g) sending a busy signal to the first central-office exchange when all the attendant's telephones are busy.

\* \* \* \* \*